(12) United States Patent
Günther et al.

(10) Patent No.: US 6,457,576 B1
(45) Date of Patent: Oct. 1, 2002

(54) CONTINUOUS CABLE CONVEYOR FOR STEEP AND SUBSTANTIALLY VERTICAL UP-AND-DOWN TRANSPORT OF BULK AND FLUID MATERIALS AT GREAT TRANSPORT HEIGHTS

(75) Inventors: Roland Günther, Münster; Jürgen W. Paelke, Tostedt, both of (DE)

(73) Assignee: Svedala Industri (Deutschland) GmbH, Dusseldorf (DE)

( * ) Notice: Subject to any disclaimer, the term of this patent is extended or adjusted under 35 U.S.C. 154(b) by 0 days.

(21) Appl. No.: 09/762,036

(22) PCT Filed: Jun. 14, 1999

(86) PCT No.: PCT/EP99/04093

§ 371 (c)(1),
(2), (4) Date: Mar. 13, 2001

(87) PCT Pub. No.: WO00/07908

PCT Pub. Date: Feb. 17, 2000

(30) Foreign Application Priority Data

Aug. 3, 1998 (DE) .......................................... 198 35 000

(51) Int. Cl.[7] ............................................. B65G 17/36
(52) U.S. Cl. ..................................... 198/711; 198/712
(58) Field of Search ................................. 198/701, 702, 198/711, 712

(56) References Cited

U.S. PATENT DOCUMENTS

| | | | |
|---|---|---|---|
| 3,338,379 A | 8/1967 | Patterson | |
| 4,227,609 A | 10/1980 | Gunther et al. | |
| 4,481,695 A | 11/1984 | Koster et al. | |

FOREIGN PATENT DOCUMENTS

| | | |
|---|---|---|
| DE | 638 986 | 11/1936 |
| DE | 31 42 572 | 5/1983 |
| DE | 36 41 964 A1 | 10/1987 |
| DE | 196 23 143 | 10/1996 |
| DE | 197 02 661 | 6/1997 |
| EP | 0 020 148 | 12/1980 |

OTHER PUBLICATIONS

A. Hillebrand; International Preliminary Examination Report; Mar. 13, 2000; four pages.

A. Hillebrand; International Search Report; Oct. 14, 1999; five pages.

Jürgen W. Paelke; "Progress With Continuous Steep Angle And Vertical Conveying"; bulk solids Handling; Jan./Mar. 1996; vol. 16, No. 1.

Roland Günther; Rope–Guide–Conveyer—neue Fördermittel für Stückgüter:; Hebezeuge und Fördermittel; Berlin 37 (1997) 12;533–536.

Roland Günther; "Seilfördermittel fur die Seigerförderung von Schüttgütern"; Glückauf–Forschungshefte; 52(1991) No. 3:95–97.

*Primary Examiner*—James R. Bidwell

(57) ABSTRACT

The invention relates to a continuous cable conveyor for steep and substantially vertical up-and-down transport, preferably of bulk materials up to extreme transport height which can reach approximately 1,000 m. The transport line is made of extremely resistant fiber cables used as traction means. Guide cables and individual carrier means in the form of buckets are fixed at a distance from each other, over said traction means, at cable clamping connections and endless cable connections designed in a specific manner allowing not only convex returns of the transport line but also concave returns in order to create horizontal or inclined reception and distribution areas. Said transport line is driven, returned, tensioned and guided in a non-positive manner by means of cable pulleys with a possible torsion about the longitudinal axis which can react 180°.

9 Claims, 3 Drawing Sheets

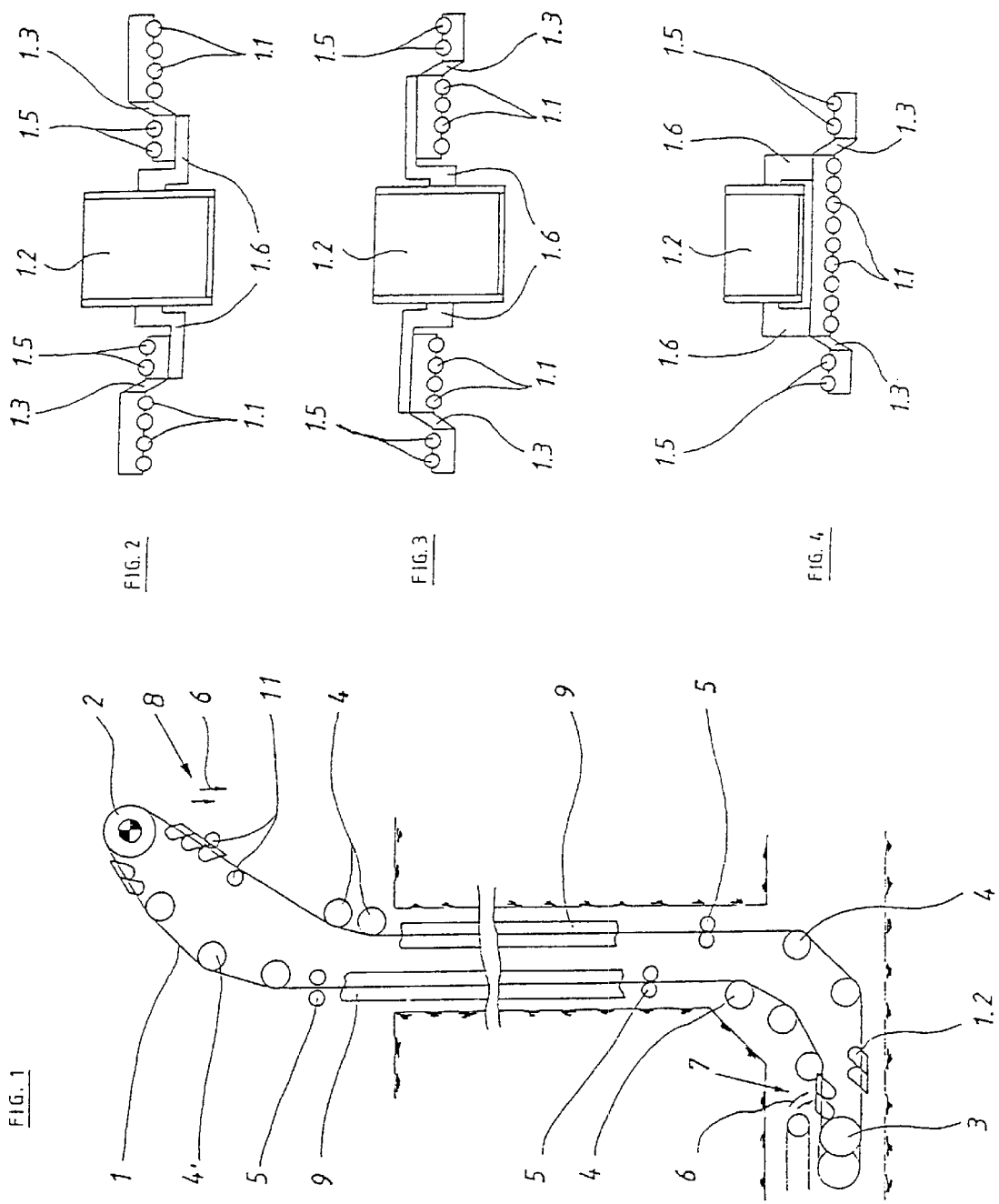

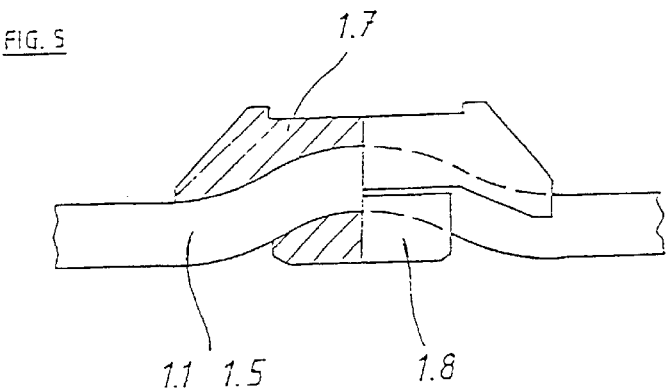
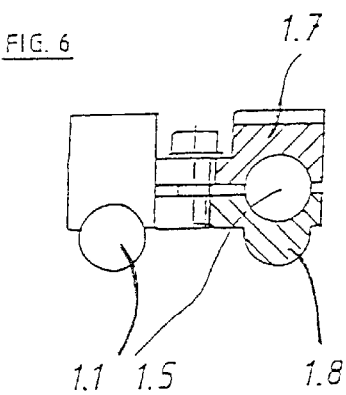
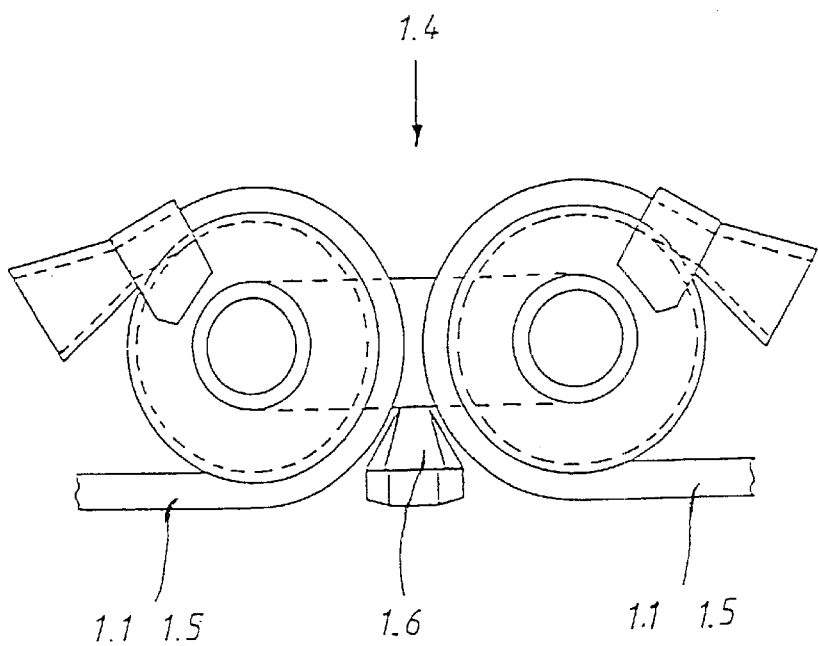

CONTINUOUS CABLE CONVEYOR FOR STEEP AND SUBSTANTIALLY VERTICAL UP-AND-DOWN TRANSPORT OF BULK AND FLUID MATERIALS AT GREAT TRANSPORT HEIGHTS

The invention relates to a continuous cable conveyor for steep and substantially vertical up-and-down transport of preferably bulk and fluid materials up to extreme transport heights of approximately 1,000 m. The material to be conveyed can thereby be filled in directly on the outside of the transport line. As a consequence also the delivery of the material to be conveyed takes place on the outside of the transport line in response to the transport speed and the return radii in accordance with the gravity or the centrifugal force principles. The material to be conveyed can, however, also be filled in directly on the inside of the transport line. The delivery of the material to be conveyed then necessarily takes place on the inside of the transport line as well according to the gravity principle.

The fields of application of such conveyors are manifold and of an increasing significance, since the winning of mineral raw materials by miners from open cut minings and drift minings having different deepnesses is increasing worldwide. Also fields relating, for instance, to cavern constructions or the construction of underground traffic routes set high demands in view of steep to vertical transports of bulk materials also from greater deepnesses. On the other hand, an increasing importance is to be seen in the down-transport, if, for example, various waste materials in the form of bulk materials have to be supplied to underground mining cavities or caverns for the ultimate waste disposal thereof.

The continuous transport of bulk material streams as of approximately 50 m³/h is already said to be economically superior as of transport heights of approximately 40 m over the non-continuous transport in drift mining, so that the pertinent state of the art is characterized by the existence of various conveying means up to a transport height range of approximately 120 m. Part thereof are the so-called bucket type elevators in manifold embodiments, whereby the dead weight of the endlessly revolving transport line and the stability thereof define a maximum transport height. The maximum transport height of bucket type elevators having a steel cord belt as traction means is approximately 120 m whereby particularly the admissible stability of the endless connection of the steel cord belt limits the transport height.

The system POCKETLIFT® is an embodiment derived from the steel cord belt bucket type elevator, in which the transport line is formed of two endless closed steel cord belts as traction means and between which the carrier means are fixed at distances from each other. The maximum transport height presently obtained with said system is approximately 200 m (see PAELKE, J. W.: "Progress with Continuous Steep Angle and Vertical Conveying", bulk solids handling, Volume 16, Number 1 January/March 1996).

A further increase of the transport height with said system is only possible if the stability of the belts and the width thereof is increased. Said measures, however, entail an increase in the dead weight of said traction carriers, so that the success is limited and the problem in view of the endless connection of said traction carriers is increased. By taking into account technical and economical criteria, the maximum lifting height during the transport of relevant material streams to be conveyed will have to remain limited to approximately 300 m in connection with the POCKETLIFT® system.

When using cables as traction means for endless closed transport lines increases in the transport height by far surpassing the above can basically be achieved, whereby especially cables made from extremely resistant fibers have particularly high stability values with low dead weights. Moreover, only said cables allow carrier means to be fixed by means of specific cable clamping connections (see German Patent 19702661). German Patent 3142572 moreover describes a device for detachably connecting cable ends, especially of cables with revolving cable drives in cable conveyors, which are at least suited, like the aforementioned cable clamping connections, for returns in the same direction inside a cable conveyor having an endless closed transport line.

Such a cable conveyor is described in the Glückauf-Forschungsheft (Glückauf Research Magazine) 52 (1991), No. 3, pages 95–98 as well as in Hebezeuge und Fördermittel (Lifting Tools and Conveying Means), Berlin 37 (1997) 12, pages 533–536.

Both publications describe the knowledge that solely cables made from extremely resistant fibers, especially from aramides, are suited as traction means in such cable conveyors. The pertinent cable clamping connections and the detachable endless connections are thereby so designed that cable pulleys for the drive, the return and diverse deflections can be passed without any difficulties, i.e. without disadvantageous polygon effects.

A cable bucket type conveyor is described in U.S. Pat. No. 4,227,609, where the cables are inserted as laterally disposed traction means. The carrier means are clamped between said cables at the bends thereof at distances from each other. The returns of the transport line are possible only in one bending direction.

The German laid open application 3641964 likewise describes a conveyor for the continuous vertical transport of bulk materials at great transport height differences comprising cables made of extremely resistant fibers as traction means, which allows returns of the transport line in one bending direction only.

In view of the detachable endless connection of the traction means the number thereof is, moreover, limited to a few cables per side only, which opposes a maximization of the transport height.

The German Patent 638986 describe s an endless conveyor comprising catches such as plates, containers or the like attached to the driving members formed of cables, which, in view of a maximization of the transport height and the stability values in the traction means entailed thereby, is not suited for the aimed at transport height range up to approximately 1,000 m.

The transmission of the peripheral forces to the drive pulley, which is partially non-positive and partially positive, can technically not be realized even with small transport heights and transport speeds.

Said assessment also refers to the variant of a conveyor described in U.S. Pat. No. 3,338,379.

The European Patent Application 0020148 describes improvements relating to bucket type elevators and conveyors allowing a bending direction of a transport line with laterally disposed cables as traction means in alternate directions. In this case, however, the returns are possible only with cable pulleys having corresponding recesses for the attachment points of the carrier means and the endless connection. Here, too, the provided positive transmission of the peripheral force only allows the use in secondary cases of application, in other words, for small transport heights and thus small stability values in the traction means, the number of which has to remain limited to a great extent for constructional reasons.

The German laid open application 19623143 describes a conveyor for the continuous inclined and vertical transport of bulk materials and sludges up to extreme transport heights involving a reception of the material to be conveyed primarily in accordance with the bailing principle, with the traction means being formed of extremely resistant fiber cables and the carrier means being fixed thereon by means of clamping connections at distances from each other such that returns of the transport line are possible in one bending direction only.

A transport line constructed in such a fashion, which is provided with at least one detachable endless connection, basically allows the realization of transport heights in the aimed at range. However, the expectations have to be reduced in view of the likewise desired high transport streams. The proper charging according to the bailing principle only allows low transport speeds and limits the number of materials capable of being transported. Increased bailing resistances, moreover, constitute an additional limitation of the materials capable of being transported, and the loads on the connection points between the traction means and the carrier means considerably influence the working safety.

The state of the art is, therefore, already characterized by cable conveyors. However, the aim striven for according to the invention, namely to reach a transport height range far above 150 m when transporting common mass streams, will not be achieved with any of said variants. Merely the conveyor described in the German laid open application 196 23 143 approximately allows the striven for transport height.

The transport of a common mass stream is thereby strongly limited, however, as this can only be achieved with relatively high transport speeds. The bailing resistances to be expected in this connection and the definitely improper charging of the carrier means considerably limit the application.

For avoiding said disadvantages, a continuous cable conveyor for steep and substantially vertical up-and-down transport of preferably bulk and fluid materials up to extreme transport heights of approximately 1,000 m is proposed according to the invention, which on one hand comprises a non-positively working drive system allowing high transport speeds, and whereby also reverse bends of the transport line are possible on the other hand. Especially due to the latter feature is a direct charging of the carrier means possible, for instance, according to the principle of the outer transport. The carrier means can be emptied in response to the transport speed and the return radii of the transport line in accordance with the gravity or the centrifugal force principle.

The kinetic resistances as a result of charging the material to be conveyed remain reduced, which likewise reduces the maximum admissible strain of the transport line.

Said features of the cable conveyor according to the invention are achieved by special measures in terms of the design of the clamping connections between the traction means and the carrier means and of the endless connections.

Said endless connections are, moreover, detachable and allow for the compensation of different fabrication lengths of the traction means.

The fact that the endless cable connections are constructed as detachable connections allows partial extensions and shortenings of the transport line, if required, and particularly an easy mounting of the transport line.

An embodiment of the cable conveyor according to the invention is illustrated in the drawing and will hereinafter be described.

FIG. 1 shows a line direction of the cable conveyor according to the invention for the vertical up-transport of a material stream to be conveyed. The material to be conveyed (6) is directly charged into the carrier means (1.2) of the transport line (1) via a charging station (7), in which carrier means (1.2) it is transported to the discharging station (8) for the material to be conveyed according to the outer transport principle. The transport line (1) thereby passes in a concave bending direction one or several return or deflection cable pulleys (4) and guide cable pulleys (5) before the transport line (1) is forwarded to the tug pulley (2) via additional deflection cable pulleys (4) in the convex bending direction, where, in the area of the discharging station (8) for the material to be conveyed (6), the material to be conveyed is discharged in response to the transport speed and return radii of the transport line (1) in accordance with the gravity or centrifugal force principle.

In the following the transport line (1) is bent over one or several return or deflection cable pulleys (4) in the concave bending direction so as to be deflected again in the convex bending direction after having passed additional guide cable pulleys (5). Hereinafter the transport line (1) passes a reversing cable pulley or, respectively, a tension cable pulley (3) so as to reach the charging station (7) for the material to be conveyed anew.

FIG. 2 illustrates a transport line (1) in a cross-section. It can be seen that the carrier means (1.2) is disposed in the center and that the traction means (1.1) are symmetrically provided on the external sides. Guide cables (1.5) are disposed between said traction means (1.1) and said carrier means (1.2) which, given bends of the transport line (1) in the concave bending direction, run around the non-illustrated deflection cable pulleys (4).

The traction means (1.1) and the guide cables (1.5) are at distances combined by the cable clamping connections (1.3) to form one cable strand. The carrier means (1.2) are connected to the cable clamping connections (1.3) by means of retainers (1.6) on both sides. The detachable endless cable connections (1.4) for the traction means (1.1) as well as for the guide cables (1.5) are each disposed at larger distances from each other instead of a cable clamping connection (1.3). Also on an endless cable connection (1.4) is a carrier means (1.2) fixed by means of retainers (1.6).

FIG. 3 likewise illustrates a transport line (1) in a cross-section. section. In contrast to the version according to FIG. 2 the arrangements of the traction means (1.1) and the guide cables (1.5) have been exchanged by maintaining the central arrangement of the carrier means (1.2).

FIG. 4 likewise illustrates a transport line (1) in a cross-section. In contrast to the illustrations according to FIGS. 2 and 3 the traction means (1.1) are combined to form only one cable strand. The non-positive transmission of the peripheral force into the cable strand can only take place by means of one cable drum with a correspondingly large number of cable grooves, which merely requires a constant drive with one or two drive sets. In the variants according to the illustrations in FIGS. 2 and 3 it has to be secured on the side of the drive that the tug pulleys (2) each have identical peripheral speeds. This can, for instance, be secured in that one tug pulley is provided with a constant drive and the other additionally with a superposition drive, so that by means of a control advanced or retarded peripheral speeds are allowed for the adjustment to the peripheral speed of the other tug pulley (2).

FIG. 5 illustrates a cable clamping connection (1.3) consisting of two cables. Said clamping connection (1.3) may be designed for a plurality of cables and as a common component for traction means (1.1) and guide cables (1.5). The clamping area for the guide cables (1.5) is basically disposed with a torsion about 180° relative to the clamping area of the traction means (1.1). The neutral fiber of the traction means (1.1) is thereby identical with the neutral fiber of the guide cables (1.5). The cable clamping connection (1.3) consists of an upper part (1.7) and a lower part (1.8) which are connected to each other by means of screws. Depending on the number of cables to be connected the cable clamping connections (1.3) may have a corresponding design, whereby also several lower parts (1.8) may be associated to one upper part (1.7). Thus, an upper part for 6 cables may, for example, be connected with 3 lower parts for 2 cables.

The upper parts (1.7) are so designed that retainers (1.6) for the carrier means (1.2) may be attached thereon by means of screw connections.

FIG. 6 shows a cable clamping connection (1.3) according to FIG. 5 in a partially cut illustration.

FIG. 7 shows a detachable endless cable connection (1.4) which can be used for both the traction means (1.1) and for the guide cables (1.5). By means of a modular construction said endless cable connection (1.4) may be used for a plurality of cables in a parallel arrangement.

Figure 9:
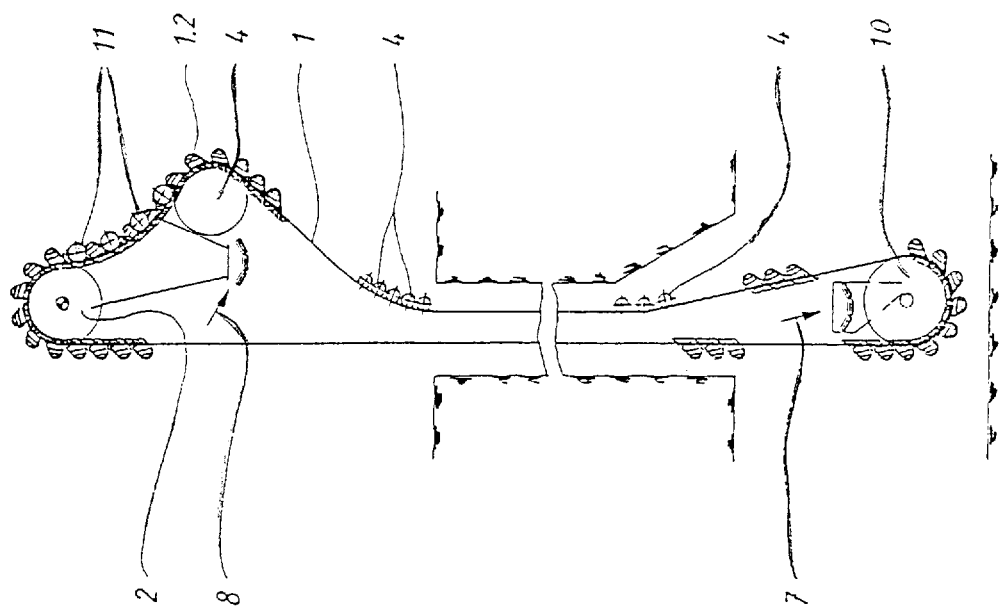

In correspondence with the cable clamping connections (1.3) the connection area for the guide cables (1.5) is arranged with a torsion about 180° relative to the connection area for the traction means (1.1). Here, too, given concave and convex bends of the transport line (1) about diverse cable pulleys, the position of the neutral fiber is identical for both the traction means (1.1) and for the guide cables (1.5). Furthermore, the detachable endless cable connection (1.4) is provided with a retainer (1.6) for the connection of a carrier means (1.2).

Figure 8:
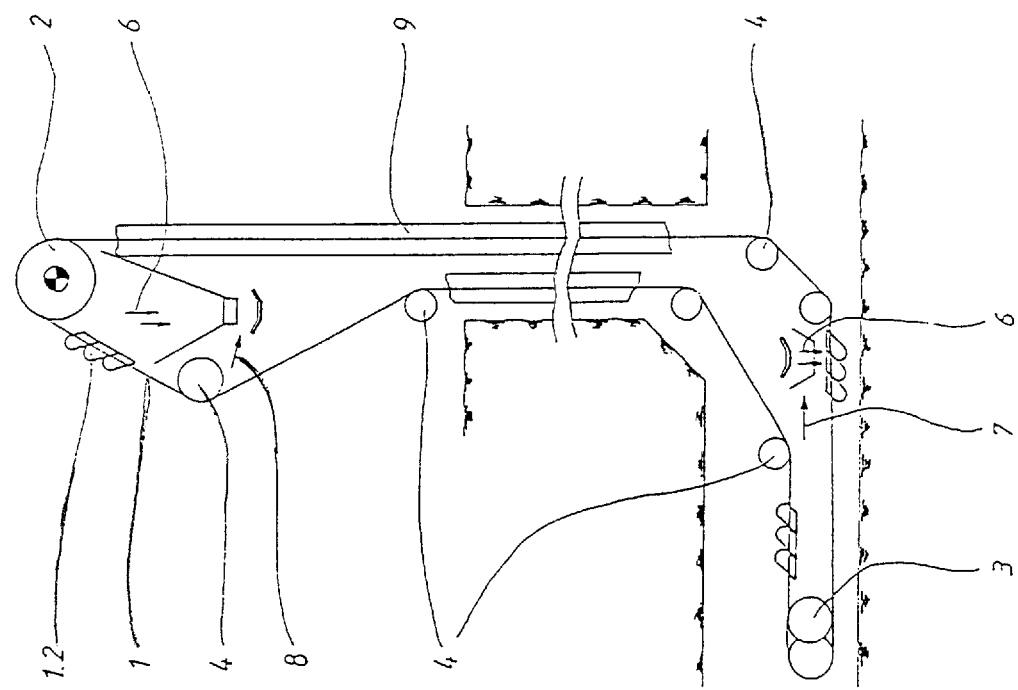

FIG. 8 shows analogously to FIG. 1 a cable conveyor according to the invention for the inner transport.

FIG. 9 shows analogously to FIG. 1 and FIG. 8 likewise a cable conveyor according to the invention for the inner transport, whereby the lower return of the transport line (1) takes place about a feeding cable drum (10) and, in the area of the discharging station (8) for the material to be conveyed, the transport line (1) is slightly deformed by cable rollers (11) during the movement in a one-sided or reciprocal manner so as to support the emptying process from the carrier means (1.2) made of flexible materials.

(3 sheets of drawings)

List of Reference Numbers 1. transport line
1.1 traction means
1.2 carrier means
1.3 cable clamping connection
1.4 endless cable connection
1.5 guide cables
1.6 retainer
1.7 cable clamping connection; upper part
1.8 cable clamping connection; lower part
2. tug pulley
3. reversing cable pulley or tension cable pulley
4. return or deflection cable pulley
5. guide cable pulley
6. material to be conveyed
7. charging station for material to be conveyed
8. discharging station for material to be conveyed
9. guide housing
10. feeding cable drum
11. cable roller

What is claimed is:

1. Continuous cable conveyor for steep and substantially vertical up-and-down transport of bulk and fluid materials up to extreme transport heights, comprising: extremely resistant fiber cables as traction means arranged in parallel, which are combined at distances from each other by cable clamping connections so as to form a cable strand provided with one or several endless rope connections for the corresponding number of cables provided as traction means; carrier means for receiving the material to be conveyed fixed on the cable clamping connections and also on the endless cable connections; and guide cables for guiding the conveyor; wherein the cable clamping connections and the endless cable connections are each provided with a clamping area or an endless connection area for additional guide cables arranged symmetrically about a center of the cable clamping connection or endless cable connection relative to the clamping area or the endless connection area for the traction means, wherein the so extended cable clamping connections are each provided with a retainer and form together an endless closed transport line being capable of passing line directions with convex and concave returns, and wherein the drive of the entire transport line takes place in a non-positive manner according to a cover drive principle.

2. Continuous cable conveyor according to claim 1, characterized in that the guide cables forming part of the transport line are disposed on outer sides of the transport line.

3. Continuous cable conveyor according to claim 1, characterized in that the traction means and the guide cables can individually be exchanged by means of cable clamping connections with a cable clamping connection upper part and a plurality of cable clamping connection lower parts, and that likewise also the endless cable connections in a modular construction allow the exchange of individual traction means and guide cables.

4. Continuous cable conveyor according to claim 1, characterized in that the transport line can be mounted, dismounted and, if required, extended or shortened in transportable partial lengths by using detachable endless cable connections.

5. Continuous cable conveyor according to claim 1, characterized in that the carrier means comprise individual buckets fixed underneath each other thereby allowing a low-loss transport in a close succession.

6. Continuous cable conveyor according to claim 1, characterized in that a lower return of the transport line takes place about a feeding cable drum in the case of inner transport, with the feeding cable drum simultaneously having the function of a tensioning station.

7. Continuous cable conveyor according to claim 1, characterized in that the guide cables forming part of the transport line are disposed inside the transport line between the carrier means and the traction means.

8. Continuous cable conveyor according to claim 1, characterized in that the endless cable connection is in the form of individual constructions in correspondence with the number of the traction means and the guide cables so as to avoid larger unbalances, whereby the individual endless cable connections are still provided with a retainer for receiving the carrier means.

9. Continuous cable conveyor according to claim 1, characterized in that cable rollers proximate a discharge station of the transport line slightly deform the transport line in a one-sided or reciprocal manner so as to facilitate emptying of the carrier means consisting of flexible materials.

* * * * *